Patented Sept. 12, 1939

2,172,505

UNITED STATES PATENT OFFICE 2,172,505

PIGMENT AND PROCESS FOR PREPARING THE SAME

Henry A. Gardner, Washington, D. C.

No Drawing. Application December 16, 1935,
Serial No. 54,787

4 Claims. (Cl. 134—58)

This invention relates to pigmented film-forming coating compositions such as paints, enamels, and pigmented lacquers, and to pigments and pigment mixtures therefor comprising metallic salts of phthalic acid which are insoluble in water and in common organic solvents (i. e., in those solvents commonly employed in the aforesaid film-forming coating compositions).

In my copending application Serial No. 727,201, filed May 23, 1934, now Patent No. 2,037,322, for improvements in "Pigmented film-forming compositions", there were disclosed the concepts of (a) employing certain metallic phthalates as pigments and (b) providing pigmented film-forming coating compositions of improved properties with respect to "chalking", color failure, and other properties, in which compositions there were employed pigment compositions comprising a minor amount of an insoluble metallic phthalate associated with a major amount of another pigment (e. g., a pigment which, in a film-forming coating composition, is known to have a tendency to chalk and/or fade).

It has been disclosed, also, in my copending application Serial No. 9348, filed March 5, 1935, now Patent No. 2,037,323, for improvements in "Pigments and film-forming compositions containing the same", that the association with the "chalking" pigment, of the titanium phthalate, even in relatively small amount, materially retarded the "chalking" and fading propensities of the same. In both of the said copending applications it was stated that the metallic phthalates could be ground to a fineness suitable in pigments adapted for use in film-forming coating compositions, and that they were valuable paint (or enamel, or lacquer) pigments in and of themselves, having good covering power, durability toward weathering, stability, inertness to the commonly encountered ingredients of film-forming coating compositions, and "non-chalking" and "non-fading" properties. According to the process specifically described and claimed in the aforesaid application Serial No. 727,201, now Patent No. 2,037,322, the metallic phthalate was associated with the other pigment by precipitating the metallic phthalate in a suspension of the other pigment in a liquid medium and then drying the resulting product. Likewise, when a metallic phthalate was to be used as the sole pigment of a film-forming composition, it was to be precipitated, separated from aqueous medium, dried, and then sub-divided in dry state to suitable fineness.

I have now found that the aforesaid advantages of associating insoluble metallic phthalates with other pigments can be realized, without the necessity of precipitating the metallic phthalate upon the other pigment, and often with better results than flowed from the prior associations, merely by intimately admixing the pre-formed metallic phthalate with the other pigment. While this admixture may be brought about in the dry state, by thoroughly mixing together the dry powdered pigments, either before or during the process of preparing a linseed oil paint or other composition, a preferred embodiment of my present invention is the admixture of a non-agglomerated dispersion of the finely subdivided metallic phthalate and of the other pigment in aqueous or oily media. This latter embodiment is also advantageous from a practical standpoint when coupled with my novel process (to be described more fully hereinafter) for transferring finely subdivided metallic phthalate from a suspension thereof in an aqueous medium to an oily, or non-aqueous, medium without drying or agglomerating the particles of the phthalate.

By the expression "insoluble metallic phthalate" used hereinafter and in the appended claims, I mean a metallic phthalate which is insoluble not only in water but also in commonly encountered organic solvents and other liquid ingredients of paints and enamels or in lacquers. Included in this group are the phthalic acid salts of: titanium; lead; copper; cobalt; cadmium; manganese; iron; barium; and mercury. I have also prepared and experimented with phthalic acid compounds of calcium, antimony, tin, chromium, aluminum, arsenic and silver. Of these the most important from a commercial standpoint appear to be the phthalic acid salts of titanium and lead.

An entirely new substance heretofore unknown is cadmium phthalate. By adding a solution of cadmium chloride to a slight excess of sodium phthalate solution in the cold, no apparent action takes place. However, upon boiling, a frothy precipitate is formed. This comes down in beautiful flakes having a highly iridescent appearance. Upon washing, filtering and drying the precipitate I find that the flakes are in the form of flat, hexagonal plates, extremely thin and very transparent. The pigment is very light and fluffy in appearance, and exhibits the same type of iridescence that is shown by fish scales. Because of its peculiar structure, it seems to have leafing properties, similar to those of aluminum powder.

I ground 20 grams of this material in approximately 100 grams of a thin nitro-cellulose lacquer, and used it as a tinting base. I added various proportions of this to a nitro-cellulose lacquer, and secured an iridescent lacquer. I also added proportions of this iridescent base to a pigmented nitro-cellulose lacquer, as well as proportions to a pigmented linseed oil varnish paint, and secured rather novel iridescent effects in both instances.

By the expression "other pigment" I mean, broadly, any heretofore known pigment, but more particularly a member of the pigment group including titanium oxide, lead-base pigments (e. g., white lead), zinc-base pigments (e. g., zinc oxide, lithopone and the like) and similar commonly employed opaque pigments.

The mixed pigments of the present invention comprise from 3 to 20 parts by weight of the metallic phthalate in admixture with from 97 to 80 parts by weight of the other pigment. In this connection I state that while association of about 10 parts of the metallic phthalate with about 90 parts of the other pigment generally suffices to give the aforesaid improvements, some combinations of specific metallic phthalates with specific other pigments require variation of the proportions within the limits above given.

The invention will be described in greater particularity with reference to the following specific examples which illustrate but do not circumscribe my invention:

*Example I*

10 parts by weight of titanium phthalate were added to 45 parts of titanium-barium pigment and 45 parts of white lead, and thoroughly mixed therewith.

*Example II*

15 parts by weight of finely divided lead phthalate were admixed with 85 parts by weight of titanium oxide.

*Example III*

5 parts by weight of the lead phthalate were added to 20 parts by weight of titanium-barium pigment, 50 parts by weight of white lead, and 25 parts by weight of zinc oxide and the composition was dry-ground for thorough admixture of the ingredients.

*Example IV*

5 parts by weight of titanium phthalate and 5 parts by weight of lead phthalate were added to 80 parts by weight of chrome green. The mixture was dry ground to secure thorough admixture of the ingredients.

After grinding the mixture in linseed oil or other film-forming liquids and preparing test panels for exposure, all of the above compositions in which the insoluble metallic phthalates were employed were found to be superior in durability and tint retention to the same pigments to which the metallic phthalates have not been added.

*Example V*

A ready mixed paint was selected, e. g., one composed of approximately 65 parts of pigment and 35 parts of liquid; the pigment consisting of 50% white lead, 25% zinc oxide, 15% titanium oxide, and 10% silica, and the liquid consisting of linseed oil, turpentine and drier. To 100 parts by weight of this mixed paint there were added 6 parts by weight of titanium phthalate or 8 parts by weight of lead phthalate. In one case the pigments were merely stirred in the paint, while in another they were ground in the paint.

Similar compositions are prepared by including the titanium phthalate at the time of preparing the mixed paint, grinding it with the other pigments and the various liquids employed in its manufacture. The resulting mixtures in all instances show, especially in tints, very much less color failure than the same compositions to which the insoluble metallic phthalates have not been added.

As was stated hereinbefore, it amounts to a material advantage to incorporate the metallic phthalate into a paint or enamel or lacquer while avoiding agglomerating the particles of the metallic phthalate.

I have found that when I prepare titanium phthalate or lead phthalate, for instance, these products invariably come down in extremely fine subdivision. My greatest difficulty has been to filter them. In a large tank, even after 24 hours settling, there may be but slight settling. Suction filtering is often necessary to get the water out efficiently. All of this illustrates the extremely fine subdivision of these products. There are no other white pigments ever produced heretofore, to my knowledge, that will not settle rapidly as compared with some of the metallic phthalates. I further find that when some of these pure precipitated phthalate pigments, especially titanium phthalate, are dried at 105° C. for a substantial period of time, they tend toward the production of semi-glazed aggregates, which makes their employment in a well dried form slightly objectionable. The drying forms gelatinous-like aggregates and it is hard to thoroughly disperse them in a paint. I have, therefore, devised the following plan of using them:

After precipitating lead phthalate, for instance I run it through a suction filter, transfer the filter cake back into the precipitating tank, wash it, and then run it again through a suction filter. This will remove the water soluble salts, such as sodium acetate, which may be present.

After precipitating titanium phthalate, I go through the same operations, using a suction filter to remove the water, and then transferring the mass back into the precipitation tank. In the case of this pigment there are usually traces of sulphuric acid which cannot be washed out by this method, since the pigment is extremely adsorptive. In order to remove these traces, I add to the pigment mass in the tank a small amount of calcium hydroxide or barium hydroxide. Through this step, the traces of sulphuric acid present will be neutralized by the interaction of the calcium and barium, and this, of course, will place in the resulting pigment a small amount of calcium sulphate or barium sulphate which sometimes is of advantage. A neutral pigment may thus be obtained, and it is of a composite nature. The pigment is then suction filtered. The concentrated water paste of either lead phthalate or titanium phthalate is then available for use in this form.

As a rule, the lead phthalate water paste will show about 50% of pigment and 50% of water, whereas the titanium phthalate paste, because of its extremely colloidal nature, may show even higher percentages of water. When white lead is ground with water to a paste, it will show about 84% of pigment and 16% of water, whereas the lead phthalate paste may show only about 50% of pigment and 50% of water; similarly, when titanium-barium pigment is ground in water, it may show about 75% of pigment and 25% of water, whereas titanium phthalate pigment may show usually only about 25 to 35 percent of pigment and from 65 to 75 percent of water. This goes to indicate the tremendous fineness of the phthalate pigments as compared to the others. Being exceptionally fine, they show high water absorption or high oil absorption.

I have thus produced rather stiff pastes yielded by suction filtering, and I have added these compounds in this form to paints. Thus, for instance, to 100 grams of ready mixed paint made of lead and zinc, or, lead, zinc and titanium pigments ground in linseed oil, I usually add from 12 to 20 grams of either one of these water pastes, and then through agitation secure a desirably smooth, uniform mixture. Apparently the dispersion obtained by this method is helped greatly by the colloidal character of the insoluble metallic phthalate pigments. Paints are thereby produced which can be brushed out to films which have an extremely high resistance to chalking, tint failure, and other defects.

As a further illustration, I have another improvement which consists in substituting alcohol for the water of the water paste referred to above, of either lead phthalate or titanium phthalate. For this I shake together equal volumes of the water paste and alcohol. The alcohol rapidly removes the water from the paste, and after two or three treatments of this character I then have an alcoholic paste of lead phthalate or titanium phthalate. This alcoholic paste can be pebble ground, if desired, or it can be employed without grinding. I prefer to employ such alcoholic paste in lacquers. Thus, to 100 pounds of a pigmented nitro-cellulose lacquer, I add about 5-15 pounds of this alcoholic paste, which is sufficient to increase the chalk resistance and decrease the tint failure which is ordinarily observed with most nitro-cellulose lacquers prepared with the usual titanium oxide or zinc sulphide pigments.

As a third embodiment of this phase of the invention, I have found that it is possible to transfer the lead phthalate or the titanium phthalate into linseed oil or other organic liquid, by the procedures mentioned above. In other words, the water paste of the pigment is shaken up with linseed oil, preferably with the aid of a small amount of lead, manganese, and cobalt drier. By this method most of the water is thrown out of the pigment and the pigment goes into the oil phase.

In another embodiment of this phase of the invention I add the water paste of either titanium phthalate or lead phthalate to alcohol which will remove much of the water. The mass is suction filtered and the alcohol paste of either pigment is then transferred to a vessel to which there is added toluol. Thorough agitation will produce a pigment dispersed in toluol with small amounts of alcohol present. This pigment can be used for addition to lacquer, or linseed oil may be added to it and simply stirred together to produce a pigment dispersed in toluol and linseed oil. Such a mixture can be used as a base to add to linseed oil or varnish paints to increase their chalk resistance and to increase their durability when in tints.

It is a remarkable fact that, by resorting to one or another of the procedures described immediately above, there is provided a paint (or enamel or lacquer, as the case may be) containing some pigment in a finer state of subdivision than any other type of pigmented film-forming coating composition heretofore known by me: the pigments in these oily or non-aqueous media approach the colloidal in size (e. g., for lead phthalate, a large proportion of the particles are of the order of one-tenth micron).

*Example VI*

In order to add to the general durability and efficiency of a composition employed for the protection of steel bottoms of vessels, I proceeded in the following manner: 160 pounds of zinc oxide, 160 pounds of red iron oxide, and 75 pounds of cuprous oxide were ground together in a varnish which consisted of 160 pounds of gum shellac, 500 pounds of alcohol, and 90 pounds of pine oil. After smooth grinding was obtained, I added to the above mixture 20 pounds of an alcoholic paste of dispersed titanium phthalate and 20 pounds of an alcoholic paste of dispersed copper phthalate that had been dispersed in alcohol, said phthalate mixtures consisting of about 35% of titanium or copper phthalates and 65% of alcohol.

*Example VII*

I selected a nitrocellulose lacquer which contained approximately 10 parts by weight of nitrocellulose, 10 parts by weight of synthetic resins, 5 parts by weight of plasticizer such as dibutyl phthalate, 15 parts by weight of titanium oxide pigment, and 60 parts by weight of solvents such as butyl acetate, butyl alcohol, and toluol. This lacquer had very good hiding properties and durability, except for the fact that it showed rapid color failure when used in tints. Therefore, to 100 parts by weight of this lacquer I added 20 parts by weight of a paste consisting of lead and titanium phthalates dispersed in twice their weight of toluol. The resulting lacquer was found to be appreciably superior in its wearing properties and tint retention properties.

*Example VIII*

I selected a glycerin phthalate liquid which contained approximately 35% of plasticized glycerin phthalate dissolved in 65% of volatile solvents. To 100 parts by weight of this liquid I added 20 parts by weight of lead phthalate and 20 parts by weight of titanium phthalate, and ground the mixture together. While it did not possess very marked hiding power, it did form a coating which upon baking gave a smooth film almost vitreous in appearance. Accordingly I added to 160 parts of the above formula 20 parts by weight of titanium oxide. After grinding the material, it was found to dry rapidly, and, upon baking, formed a smooth hard film almost vitreous in appearance and of excellent hiding power and whiteness.

*Example IX*

Where it is desired to use a lower cost form of phthalate product for pigments, than is secured by the methods outlined in the above specification, I resort to a very novel method of treatment which depends upon the adsorptivity of pigments for phthalic acid or its compounds. It is known, of course, that phthalic anhydride is somewhat soluble in water and about 1% is readily dissolved by this means. I have found, however, that particles of many pigments including titanium oxide, antimony oxide, and the like adsorb on their surfaces small amounts (e. g., less than 1%) from an aqueous solution of phthalic anhydride and that such pigments carrying adsorbed phthalic anhydride and/or phthalic acid do not thereafter lose the acid to water but rather retain the same against washing, and have to some extent the properties which are obtained by the other procedures outlined above. These pigments are representative of non-basic (i. e., acidic or neutral) pigments, which may be benefited by the absorption treatment of this invention. Thus, for instance, I prepare a cold solution of phthalic anhydride in water, this solution containing about 0.7% of phthalic anhydride. I immerse therein 1000 grams of barium-titanium oxide pigment and let it stand over night. I find that the pigment adsorbs 5.67 grams of phthalic anhydride, which is equivalent to .56%. In a similar manner, I suspend 1000 grams of calcium-titanium pigment in a similar water solution of phthalic anhydride: overnight I find the pigment adsorbs 2.72 grams of phthalic anhydride, equivalent to .27%. In a similar manner I suspend 1000 grams antimony oxide pigment in a similar water solution of phthalic anhydride. Overnight I found the pigment to adsorb 0.15% of phthalic anhydride. These pigments may be washed without removing any of the phthalic anhydride and, after drying, are suitable for use. Further exposure of these pigments to water fails to dissolve the phthalic anhydride which has been adsorbed by the pigment. Thus these pigments may be ground in paint as such, or may be mixed with other pigments and ground into paint.

Example X

To 800 grams of antimony oxide I added 20 grams of lead phthalate. The mixture was dry ground and then dispersed in oil. The resulting paint had very marked resistance to chalking when exposed out of doors, as compared to the original antimony oxide.

It is known that the most active factor in destroying protective coatings is ultraviolet light. Paints which contain pigments which transmit ultra-violet light allow such light to pass through and destroy the linseed oil or other binder. On the other hand, paints containing pigments which do not transmit substantial amounts of ultra-violet light are usually extremely durable from the standpoint of chalking resistance and tint retention. For instance, some of the measurements which have been made on the transmission of ultra-violet light by various pigments are given on pages 216, 217 and 219 of the eighth edition of my book entitled "Physical and Chemical Examination of Paints", etc., and a few of these are presented below:

| Pigment | Percent transmission of 1% dispersion of pigment in nonabsorptive vehicle layer .09 mm. thick at wavelengths (Angstrom units)— | | | | | |
|---|---|---|---|---|---|---|
| | 4358 | 4047 | 3655 | 3342 | 3131 | 3023 |
| Basic lead carbonate | 69 | 66 | 61 | 57.5 | 55 | 54 |
| Lithopone | 56 | 52 | 43 | 32 | 15 | 5 |
| Titanium-barium pigment | 39 | 39 | 18 | 13 | 12 | 11.5 |
| Zinc oxide | 44 | 38 | 0 | 0 | 0 | 0 |

While it will be noted from the above that most pigments transmit large quantities of ultra-violet light, at least in certain wave lengths, I have found that pigments which I have prepared from phthalates transmit either none or extremely low amounts of such light. For instance, some recent readings on my pigments are given below, the procedure and apparatus for the test being described at pages 216 and 217 of the seventh edition of my book entitled "Physical and Chemical Examination of Paints", etc. The mixtures tested consisted of one gram of dry pigment and 14 grams of poppy seed oil. This, of course, was an extremely dilute mixture, as it is usual to pigment oils for use in paints with at least an equal quantity by weight of pigment. However, even with such dilute mixtures the transmission was very small. In these tests the thickness of the pigment-oil layer was 0.10 millimeters.

*Transmission of ultra-violet light, in percents, by very dilute oil mixtures of phthalate pigments at various wavelengths*

| Wavelengths (Angstrom units) | 4,358 | 4,047 | 3,655 | 3,342 | 3,130 | 3,023 |
|---|---|---|---|---|---|---|
| Lead phthalate | 12 | 10 | 9 | 3 | 1 | 0 |
| Titanium phthalate | 9 | 7 | 2 | 0 | 0 | 0 |

When 80% basic lead carbonate is mixed with 20% lead phthalate the ultra-violet transmission of the mixture appears to be not greater than the approximate average for the two taken separately.

This application contains subject matter in common with my application Serial No. 727,201, filed May 23, 1934, now Patent No. 2,037,322, and my application Serial No. 9,348, filed March 4, 1935, now Patent No. 2,037,323.

I claim:

1. Process of modifying the chalking and tint-failure characteristics of a titanium oxide pigment, which comprises immersing the pigment for some time in an aqueous solution of phthalic anhydride of about 0.7% strength, whereby phthalic anhydride as such is adsorbed by the pigment particles, separating the so-treated pigment from the solution, washing the so-separated pigment with water, and drying the same.

2. Process defined in claim 1, characterized in that phthalic anhydride is adsorbed in an amount from about 0.15% to about 1% by weight of the pigment.

3. A pigment having a base of titanium oxide, the particles of which contain from about 0.15% to about 1% of adsorbed phthalic anhydride.

4. A pigment comprising titanium oxide pigment and 0.15% to about 1% of phthalic anhydride.

HENRY A. GARDNER.